N. B. MILLER.
PACKING.
APPLICATION FILED JULY 28, 1917.

1,265,233.

Patented May 7, 1918.

INVENTOR
Norman Bruce Miller
BY
Arthur Phelps Marr
ATTORNEY

UNITED STATES PATENT OFFICE.

NORMAN B. MILLER, OF BROOKLYN, NEW YORK.

PACKING.

1,265,233.

Specification of Letters Patent.  Patented May 7, 1918.

Application filed July 28, 1917.  Serial No. 183,312.

*To all whom it may concern:*

Be it known that I, NORMAN BRUCE MILLER, a citizen of the United States, and resident of the borough of Brooklyn, county of Kings, city and State of New York, have invented certain new and useful Improvements in Packings, of which the following is a specification.

The packing referred to in this application will be termed a combination packing, and by the term combination as herein used I refer to the construction of the packing which combines two principles.

In the past the so called wedge set packing has been successfully used though it has been found to contain certain objectionable features. In the past arched packing or packing having an external casing has been used though some constructions of that packing are found noncompressible to a degree that makes their operation unsatisfactory.

In this packing I have combined the construction of the so called wedge set packing and the construction of the arched' packing, and obtain from the combination the best operable functions of both of the predecessors.

The following is what I consider a good means of carrying out this invention and the accompanying drawings should be referred to for a complete understanding of the specification which follows.

In the drawings:—

Similar reference numerals indicate like parts in all of the figures where they appear.

Figure 1:
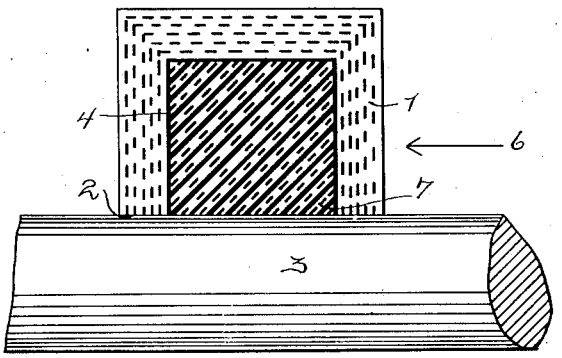
Figure 1 shows a sectional view of my packing.

The object of this application and the construction shown therein is to provide a packing having a casing 1, which may be formed of alternate layers of canvas and a so called friction material such as rubber. The thickness of this casing may be varied at will, but I prefer that it should be constructed as shown of five layers of canvas with alternate layers of rubber.

The casing 1 is constructed as an open box in cross section. The open side 2 being the side which will rest adjacent to a piston rod 3 or other moving body which it is desired to pack.

Within the casing 1 I arrange a plurality of layers of canvas as indicated at 4, and I prefer that each layer of canvas should be impregnated with friction material or rubber.

Between the layers of canvas I place layers of soft rubber, a rubber vulcanized to a less degree than that used for the friction, and it will be noted that the layers 4 of canvas are arranged oblique to the supporting casing.

The several layers of canvas 4, and the layers of rubber 5 between them may be termed a filler, and this filler should be secured into the casing 1 by means of the use of soft rubber such as is used between the separate layers of canvas.

I desire it understood that the soft rubber used in the construction of this packing and referred to as such must not have sufficient strength to hold the filler firmly in the casing during the operation of the packing, nor must it secure the layers of the filler in the position shown. In fact the ability of the separate layers of the filler to operate independently of all of the others and the ability of the filler itself to adjust its position within the casing is the most important feature of this present invention.

The pressure upon this packing will be in the direction of the arrow 6, when the packing is in use and the passage of a rod 3 over this packing will cause the packing to wear away, not evenly but rather unevenly to the extent that the greatest wear will occur where the layers of the filler are shortest, that is, at about the point 7. The ability of the filler to move in its casing will allow the packing to adjust itself during operation thus compensating for wear. The ability of the separate layers to move independently prevents the packing from hardening, and also from becoming useless due to any inequalities, either in the rod or in the wear of the packing.

The sides of the casing extend radially from the rod. The filler is arranged at an angle or obliquely to the side walls of the casing, and, therefore, the separate members of which the filler is formed are of different lengths, and one of the shortest lengths is adjacent to the open side of the casing.

It is obvious that the shortest lengths of the filler are weakest, but I prevent these short lengths from breaking away from the main body by offering them the support of the sides of the casing. It will be noted that at the point indicated by the lead line 7 the filler is well supported and guarded by the adjacent and radially disposed side wall of the exterior casing 1.

Figure 2:
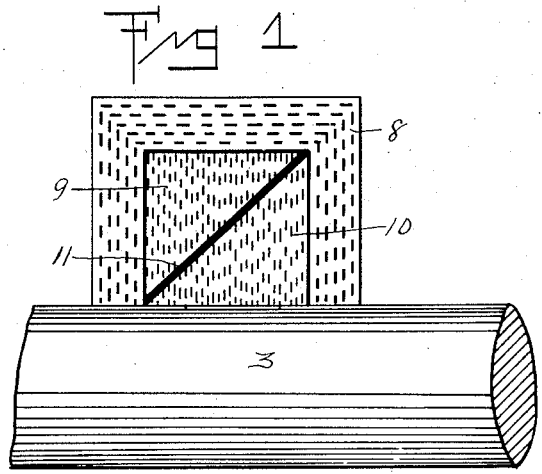
Fig. 2 is a sectional view of a packing having certain changes in construction.

The casing also supports the extreme ends, the weakest portions of the wedges 9 and 10 shown in Fig. 2.

In Fig. 2 I show a packing having a casing 8, and two wedging members 9 and 10 joined by a temporary binding material 11. In this construction the wedges 9 and 10 are free to move one upon the other, and both may move in the casing 8, but the members 9 and 10 each move or operate as an integral unit. The separate layers of these members do not have the ability to move independently.

Figure 3:
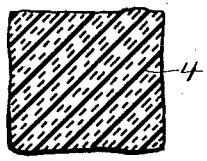
Fig. 3 shows a sectional view of modification.

The packing shown in Fig. 2 has, however, many of the advantages of that shown in Fig. 1, and in Fig. 3 I show that the independently moving portions of the filler may be made up of a plurality of layers, a number less than the entire number shown in Fig. 2.

In each of these constructions I desire the support of a casing and the functions of a wedge, and, therefore, the casing should be constructed with an open side, and in each instance the filler should be only temporarily retained, retained only with sufficient strength to allow the packing to be placed, after that the filler will operate as a loose member within the casing, and by providing means such as that described for temporarily retaining the filler within the casing, it is unnecessary to have the casing continue completely around the filler.

Modifications may be made within the scope of the appended claims without departing from the principle or sacrificing the advantages of the invention.

Having carefully and fully described my invention what I claim and desire to secure by Letters Patent is:—

1. A packing comprising a casing, one side of which is open, and adapted to receive the wear of a rod, a filler within said casing comprising a plurality of obliquely disposed layers each of which is adapted to an independent movement in relation to each other and to said casing.

2. A packing comprising an open sided casing a plurality of obliquely arranged members within said casing one end of each said members being adjacent to the open side of said casing.

3. A packing comprising a casing, a plurality of flat obliquely arranged members temporarily secured one to the other, and comprising a filler and means for temporarily retaining said filler within said casing.

4. A packing comprising a casing a plurality of obliquely disposed independent and parallel members within said casing, and means for temporarily retaining said members adjacent to each other and within said casing.

5. A packing comprising a casing of open box cross section, a plurality of obliquely disposed members within said casing, and each arranged with one of its ends adjacent to the open side of said casing, and means for temporarily retaining said members adjacent to each other, and within said casing as and for the purpose set forth.

Signed at New York city, county and State of New York this 11th day of July 1917.

N. B. MILLER.

Witnesses:
G. E. S. MARR,
ARTHUR PHELPS MARR.